United States Patent [19]

Okano et al.

[11] 4,449,622

[45] May 22, 1984

[54] COVER MEMBER FOR A MAGNETICALLY OPERATED CLUTCH

[75] Inventors: Reijiro Okano, Chiryu; Kiyoshi Usami, Oobu, both of Japan

[73] Assignee: Nippondenso Co., Ltd., Kariya, Japan

[21] Appl. No.: 380,251

[22] Filed: May 20, 1982

[30] Foreign Application Priority Data

May 21, 1981 [JP] Japan .................. 56-76849

[51] Int. Cl.³ .......................................... F16D 27/06
[52] U.S. Cl. .................. 192/84 C; 310/78; 310/88; 310/90
[58] Field of Search ............... 277/212 F; 192/84 C; 308/187.1, 236; 310/78, 88, 90, 92; 192/84

[56] References Cited

U.S. PATENT DOCUMENTS

| | | | |
|---|---|---|---|
| 3,226,168 | 12/1965 | Recknagel | 308/187.1 |
| 3,604,545 | 9/1971 | Bourgeois | 192/98 |
| 3,743,068 | 7/1973 | Westervelt et al. | 192/84 C |
| 3,882,976 | 5/1975 | Nash | 188/306 |
| 4,187,939 | 2/1980 | Silvestrini et al. | 192/84 C |

*Primary Examiner*—J. D. Miller
*Assistant Examiner*—D. Rebsch
*Attorney, Agent, or Firm*—Cushman, Darby & Cushman

[57] ABSTRACT

An electromagnetic clutch is disposed between a drive source and a driven device for connecting and disconnecting the drive source to and from the driven device, respectively. The electromagnetic clutch includes a body rotatable by the rotative power from the drive source and an armature faced to, but normally spaced from the rotatable body. An exciting solenoid when energized moves the armature into an engaging position where the armature is attracted and urges against an end face of the rotatable body. A bearing is disposed between a fixed member of the driven device and the inner peripheral surface of the rotatable body for rotatably supporting the rotatable body on the fixed member. A cylindrical cover member is fixedly mounted, independently of the bearing, on a portion of the inner peripheral surface of the rotatable body between an axial end face thereof and the bearing. The cover member includes a peripheral wall covering a gap between the rotatable body and the armature and an annular end wall extending radially inwardly from an axial end of the peripheral wall by a considerable distance and cooperating with the peripheral wall to define a reservoir for oil and grease.

11 Claims, 2 Drawing Figures

PRIOR ART

COVER MEMBER FOR A MAGNETICALLY OPERATED CLUTCH

BACKGROUND OF THE INVENTION

1. Field of the Invention

The present invention relates to an electromagnetic clutch for respectively connecting and disconnecting a drive source to and from a driven device having a fixed hollow cylindrical projection and a rotatable shaft extending within the hollow projection in concentric relation thereto. More particularly, the present invention relates to an electromagnetic clutch suitable for use with a compressor used in an air-conditioning system installed on a motor vehicle, for example.

2. Description of the Prior Art

An electromagnetic clutch of the kind referred to above comprises a rotatable body made of magnetizable material. The rotatable body is disposed around a fixed hollow cylindrical projection of a driven device, such as a compressor for a cooler in concentric relation to the cylindrical projection and is drivingly connected to a drive source, such as an engine of a motor vehicle for rotation around an axis of a shaft of the driven device. The rotatable body has its inner peripheral surface faced to the cylindrical projection and opposite axial end faces. A bearing is disposed between the outer peripheral surface of the cylindrical projection and the inner peripheral surface of the rotatable body for supporting the rotatable body on the cylindrical projection.

An armature made of magnetizable material and connected to the shaft for rotation therewith is faced to one of the opposite axial end faces of the rotatable body, but is normally spaced therefrom by a suitable gap. The armature is movable between an engaging position where the armature is attracted and abuts against the one axial end face of the rotatable body to allow the rotation of the rotatable body by the drive source to be transmitted to the shaft and a disengaging position where the armature is spaced from the one axial end face of the rotatable body by the suitable gap to prevent the rotation of the rotatable body from being transmitted to the shaft. An exciting solenoid is associated with the armature to move the same between the engaging and disengaging positions in response to energization and deenergization of the solenoid.

The rotatable body has formed on its inner peripheral surface an annular shoulder adjacent to the one axial end face of the body. In addition, the cylindrical projection of the driven device has formed in its outer peripheral surface an annular groove at a location substantially radially opposite to the annular shoulder. A cylindrical cover member is disposed adjacent to the bearing for preventing leaked oil and grease from entering the gap between the armature and the one axial end face of the rotatable body. The cylindrical cover member includes a peripheral wall for covering the gap, and an annular end wall extending from an axial end of the peripheral wall remote from the bearing and cooperating with the peripheral wall to define a reservoire for the leaked oil and grease. The cylindrical cover member has an annular flared portion projecting substantially radially outwardly from the other end of the peripheral wall of the cover member. Upon the assembly of the electromagnetic clutch, the flared portion is clamped by and between the annular shoulder and an axial end of the bearing. Thus, the cylindrical cover member is fixedly mounted on the inner peripheral surface of the rotatable body. Thereafter, a snap ring is caused to pass through an opening defined by the annular end wall of the cover member toward the bearing, and is fitted in or snapped into an annular groove in the outer peripheral surface of the cylindrical projection of the driven device so that the bearing is held in position against axial movement.

With the prior art arrangement described above, the diameter of the opening defined by the annular end wall of the cylindrical cover member is required to have a size sufficient to enable the snap ring to pass through the opening. This makes it impossible to increase the radial length of the annular end wall of the cover member. Accordingly, the oil reservoir defined by the peripheral wall and the annular end wall of the cylindrical cover member cannot receive therein a considerable amount of oil and grease. In addition, in the case where the bearing has a small radial dimension between the inner and outer peripheral surfaces of the bearing, it is difficult and troublesome to fit the snap ring into the annular groove, because the cylindrical cover member is previously installed and the snap ring is required to pass through the opening defined by the annular end wall of the cover member.

SUMMARY OF THE INVENTION

An object of the present invention is to provide an electromagnetic clutch which facilitates the assembling operation, particularly, the attachment of the snap ring and which enables the reservoir for oil and grease to have an increased volume.

According to the present invention, there is provided an electromagnetic clutch for respectively connecting and disconnecting a drive source to and from a driven device having a fixed hollow cylindrical projection and a rotatable shaft extending within the hollow projection in concentric relation thereto, the electromagnetic clutch comprising: a rotatable body made of magnetizable material and disposed around the hollow cylindrical projection of the driven device in concentric relation thereto, the rotatable body being drivingly connectable to the drive source for rotation around an axis of the shaft and having an inner peripheral surface faced to the cylindrical projection and opposite axial end faces; a bearing disposed between an outer peripheral surface of the cylindrical projection and the inner peripheral surface of the rotatable body for rotatably supporting the rotatable body on the cylindrical projection; an armature made of magnetizable material and connectable to the shaft of the driven device for rotation therewith, the armature being faced to one of the opposite axial end faces of the rotatable body, but normally spaced therefrom by a suitable gap, the armature being movable between an engaging position where the armature is attracted and abuts against the one axial end face of the rotatable body to allow the rotation of the rotatable body by the drive source to be transmitted to the shaft and a disengaging position where the armature is spaced from the one axial end face of the rotatable body by the suitable gap to prevent the rotation of the rotatable body from being transmitted to the shaft; an exciting solenoid associated with the armature for moving the same between the engaging and disengaging positions in response to the energization and deenergization of the solenoid; and a cylindrical cover member fixedly mounted, independently of the bearing, on a portion of the inner peripheral surface of the rotatable body between the one axial end face thereof and the bearing for covering the gap between the one axial end face of the rotatable body and the armature, the cylindrical cover member having an annular end wall extending radially inwardly from an axial end of the cylindrical cover member remote from the bearing.

DETAILED DESCRIPTION OF THE PREFERRED EMBODIMENT

Figure 1:
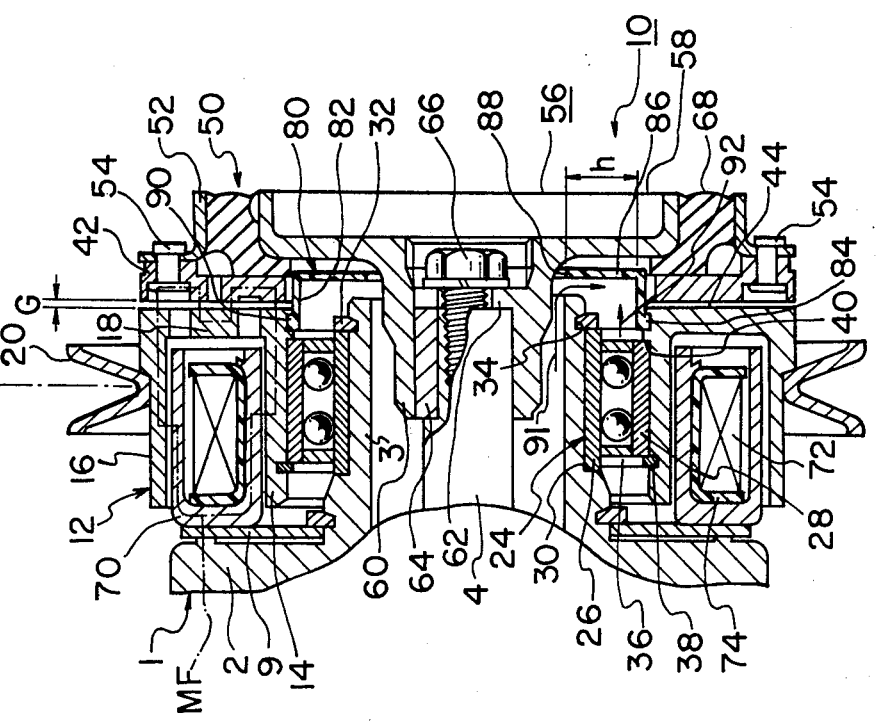
FIG. 1 is a cross-sectional view of an electromagnetic clutch in accordance with an embodiment of the present invention.

Referring to FIG. 1, there is shown an electromagnetic clutch in accordance with an embodiment of the present invention which is applied to a compressor 1 for a cooler used in motor vehicles and is generally designated by the reference character 10. The compressor 1 comprises a fixed housing 2 having a hollow cylindrical projection 3 and a rotatable shaft 4 extending within the projection 3 in concentric relation thereto. More particularly, the electromagnetic clutch 10 in accordance with the embodiment of the present invention shown in FIG. 1 respectively connects and disconnects a drive source, such as an engine 5 to and from the compressor 1 which is a driven device.

The electromagnetic clutch 10 includes a rotatable body 12 made of magnetizable material. The rotatable body 12 includes radially inner and outer peripheral walls 14 and 16 in concentric relation to the rotatable shaft 4 of the compressor 1, and an annular end wall 18 extending between an axial end of the inner peripheral wall 14 and the corresponding axial end of the outer peripheral wall 16 to define an annular recess in the rotatable body 12. An annular V-grooved member 20 is fixedly mounted on the outer peripheral wall 16 in concentric relation to the shaft 4 of the compressor 1. The V-grooved member 20 is connected to a pulley 6 of the engine 5 through a V-belt 7 so that the rotatable body 12 is continuously rotated around the shaft 4 of the compressor 1 during the running of the engine 5.

A bearing 24 having inner and outer races 26 and 28 is disposed between the outer peripheral surface of the cylindrical projection 3 on the housing 2 of the compressor 1 and the inner peripheral surface of the inner peripheral wall 14 of the rotatable body 12 for rotatably supporting the rotatable body 12 on the cylindrical projection 3. More particularly, the inner race 26 of the bearing 24 has one axial end thereof abutting against a shoulder 30 on the outer peripheral surface of the cylindrical projection 3 and the other axial end abutting against a snap ring 32 snapped into or fitted in an annular groove 34 formed in the outer peripheral surface of the cylindrical projection 3. The outer race 26 has one axial end thereof abutting against the snap ring 36 fitted in an annular groove 38 formed in the inner peripheral surface of the inner peripheral wall 14 of the rotatable body 12 and the other axial end abutting against a shoulder 40 on the inner peripheral surface of the inner peripheral wall 14. Thus, the bearing 24 is held in position against axial movement.

A ring-like armature 42 made of magnetizable material is connected to the shaft 4 of the compressor 1 for rotation therewith, and is faced to an end face or attracting face 44 of the end wall 18 of the rotatable body 12, but spaced therefrom through a suitable gap G. The armature 42 is movable between an engaging position where the armature is attracted and abuts against the attracting face 44 of the rotatable body 12 to allow the rotation of the rotatable body 12 by the engine 5 to be trransmitted to the shaft 4 of the compressor 1 and a disengaging position where the armature is spaced from the attracting face 44 by the gap G to prevent the rotation of the rotatable body 12 from being transmitted to the shaft 4.

A connecting mechanism 50 for connecting the armature 42 to the shaft 4 of the compressor 1 for rotation therewith includes a ring 52 having a L-shaped cross-section and fixed to the armature 42 by rivets 54 at a plurality of circumferentially spaced locations. The connecting mechanism 50 further includes a hub 56 which has a cup-shaped body portion 58 and a hollow projecting portion 60 extending axially from the bottom of the cup-shaped body portion 58 toward the compressor 1. The shaft 4 of the compressor 1 is received in the hollow projecting portion 60 and has a free end face abutting against a circumferential projection 62 formed on the inner peripheral surface of the hollow projecting portion. The shaft 4 is fixedly connected to the hollow projecting portion 60 of the hub 56 through a key 64 for rotation therewith. In addition, the hub 56 is fixed to the shaft 4 by a bolt 66 passing through an opening in the bottom of the hub 56 in communication with the hollow portion of the hollow projecting portion 60 and threadedly engaged with the shaft 4 with a head of the bolt 66 abutting against the circumferential projection 62. A cushion ring 68 made of resilient material, such as rubber is positioned between the ring 52 and the cup-shaped body portion 58 of the hub 56 and is adhesively secured thereto. The cushion ring 68 has an annular portion positioned between the ring 52 and cup-shaped body portion 58 and an annular portion positioned between the armature 42 and the cup-shaped body portion 58. Because of the cushion ring made of resilient material, the connecting mechanism 50 connects the armature 42 and the shaft 4 to each other so as to allow the armature 42 to be rotated with the shaft 4 and also allow the armature 42 to move toward and away from the attracting face 44 of the rotatable body 12.

A yoke 70 made of magnetizable material and having a generally U-shaped cross-section is concentrically disposed within the annular recess defined by the inner and outer peripheral walls 14 and 16 and the annular end wall 18 of the rotatable body 12, and is welded to an annular plate 9 which is fixedly secured to the housing 2 of the compressor 1. An annular solenoid 72 is concentrically disposed within the cylindrical yoke 70 and is located axially opposite to the armature 42. An insulating ring 74 made of material such as epoxy resin and having a generally U-shaped cross-section is disposed between the solenoid 72 and the yoke 70 to prevent the solenoid from being in direct contact with the yoke.

A cylindrical cover member 80 located adjacent to the axial end of the bearing 24 may be made of a material having resiliency, such as resin, iron sheet, hard rubber or the like. In the illustrated embodiment, the cover member 80 is made of 66-nylon. The cover member 80 has a peripheral wall 82, an annular projection 84 extending radially outwardly from an axial end of the peripheral wall and an annular end wall 86 extending radially inwardly from the opposite axial end of the peripheral wall toward the outer peripheral surface of the projecting portion 60 of the hub 56 to define a central opening 88. The annular projection 84 may be tapered or may have an arcuate cross-section to facilitate the installation of the cover member 80. The annular projection 84 of the cover member 80 is snapped into an annular groove 90 formed in the inner peripheral surface of the inner peripheral wall 14 of the rotatable body 12 so that the cover member 80 is fixed in position. The annular groove 90 is located between and spaced from the attracting face 44 and the shoulder 40 against which the bearing 24 abuts. Thus, the cover member 80 is fixedly mounted, independently of the bearing 24, on a portion of the inner peripheral surface of the inner peripheral wall 14 between the attracting face 44 and the bearing 24. The peripheral wall 82 of the cover member 80 covers the inner peripheral edge of the gap G between the attracting face 44 of the rotatable body 12 and the armature 42 to prevent the leaked oil flowing from the compressor 1 as indicated by an arrow 91 and the grease for the bearing 24 flowing as indicated by an arrow 92, from being introduced into the gap G. It is desirable that the annular end wall 86 of the cover member 80 has its radial length h as long as possible. In other words, it is desirable that the opening 88 defined by the annular wall 86 has its diameter as small is size as possible. The reason for this is that the annular end wall 86 cooperates with the peripheral wall 82 to define a reservoir for the leaked oil from the compressor 1 and the grease for the bearing 24, and the annular end wall 86 having the increased radial length enables the reservoir to have an increased volume.

The cylindrical cover member 80 is secured to the inner peripheral wall 14 of the rotatable body 12, independently of the bearing 24. This enables the cover member 80 to be secured to the inner peripheral wall 14 of the rotatable body 12, after the snap ring 32 has been snapped into the annular groove 34. This, in turn, eliminates the necessity to cause the snap ring 32 to pass through the opening 88. Accordingly, it is possible to decrease the diameter size of the opening 88.

In operation, when an electric current is supplied to the exciting solenoid 72, magnetic flux is produced as indicated by the dot-chain line MF. The armature 42 is moved into the engaging position where the armature is attracted and abuts against the attracting face 44 of the rotatable body 12. The power from the engine 5 is transmitted to the shaft 4 through the pulley 6, V-belt 7, rotatable body 12, armature 42, cushion ring 68 and hub 56 to rotate the shaft 4, thereby to actuate the compressor 1.

When the exciting solenoid 72 is deenergized, the magnetic flux is extinguished, and the armature is moved to the disengaging position show in FIG. 1 under the resilient force of the cushion ring 68, to disconnect the compressor 1 from the engine 5, thereby to halt or suspend the operation of the compressor 1.

The projection 90 of the cylindrical cover member 80 may be circumferentially continuous, or may be discontinuous. If the cover member 80 is made of an iron sheet material having low resiliency, the peripheral wall 82 may be provided with a plurality of radially outwardly extending and circumferentially spaced lugs which are fitted in the annular groove 90, in place of the annular projection 84. The cylindrical cover member 80 may be secured to the inner peripheral surface of the inner peripheral wall 14 of the rotatable body 12 by means of knurling, adhesive bonding, welding or the like. In such case, the annular projection 84 may be unnecessary.

As described above, in the electromagnetic clutch in accordance with the present invention, since the cylindrical cover member 80 is fixedly mounted on the inner peripheral wall 14 independently of the bearing 24, it is possible to secure the cylindrical cover member 80 to the inner peripheral wall 14 of the rotatable body 12, after the snap ring 32 has been snapped into the annular groove 34 to axially position the bearing 24, upon the assembly of the electromagnetic clutch. In other words, upon the assembly of the clutch, it is not required to cause the snap ring 32 to pass through the opening 88 defined by the annular end wall 86. This enables the radial length h of the annular end wall 86 to be increased, thereby to enable the oil reservoir defined by the annular end wall 86 and the peripheral wall 82 to have an increased volume. In addition, upon the assembly of the electromagnetic clutch, since the snap ring 32 is snapped into the annular groove 34 prior to the installation of the cylindrical cover member 12, the snap ring can be easily fitted in the annular groove 34, even if the bearing 24 has a reduced radial dimension between the inner and outer peripheral surfaces of the bearing, i.e., even if the distance between the inner peripheral surface of the inner peripheral wall 14 of the rotatable body 12 and the outer peripheral surface of the projection 3 on the housing 2 of the compressor 1 is small.

Figure 2:
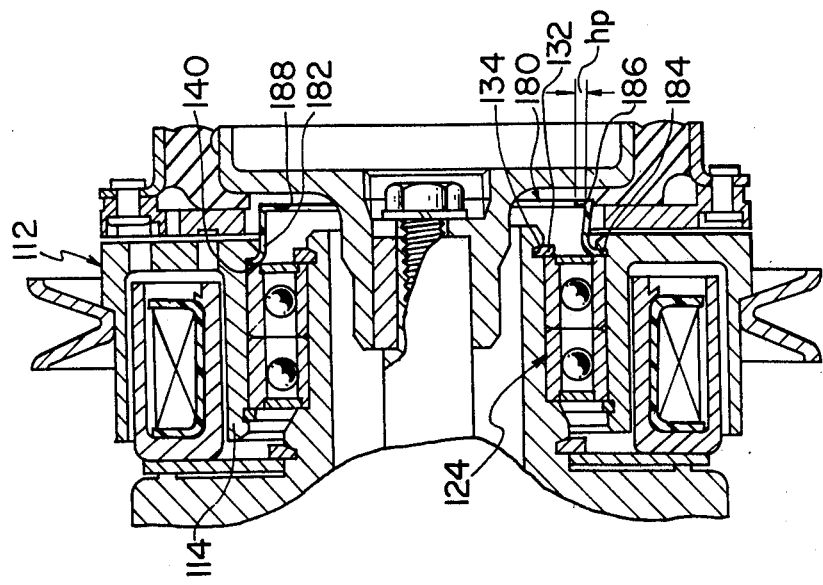
FIG. 2 is a view similar to FIG. 1, but showing the prior art electromagnetic clutch discussed previously.

FIG. 2 shows the prior art electromagnetic clutch similar to that of the present invention and discussed in the introductory part of this specification. In the prior art electromagnetic clutch, a cylindrical cover member 180 is secured to a rotatable body 112 in such manner that a flared portion 184 extending substantially radially outwardly from an axial end of a peripheral wall 182 of the cover member is clamped by and between an axial end of a bearing 124 and a shoulder 140 on an inner peripheral wall 114 of the rotatable body 112. Thereafter, a snap ring 132 is caused to pass through an opening 188 defined by an annular end wall 186 of the cylindrical cover member 180 toward the bearing 124 and then is snapped into or fitted in an annular groove 134.

In the prior art electromagnetic clutch shown in FIG. 2, the opening 188 defined by the annular end wall 186 of the cylindrical cover member 180 is required to have a diameter of size sufficient to allow the snap ring 132 to pass through the opening 188. This makes it impossible to increase the radial length hp of the annular end wall 186, so that a reservoir for oil and grease defined by the peripheral wall 182 and the annular end wall 186 cannot be increased in volume. In addition, if the bearing 124 has its reduced radial dimension betweeen its inner and outer peripheral surfaces, it is troublesome and difficult to fit the snap ring 132 into the groove 134, because the cylindrical cover member is previously installed.

What we claim is:

1. An electromagnetic clutch for respectively connecting and disconnecting a drive source to and from a driven device having a fixed hollow cylindrical projection and a rotatable shaft extending within said hollow projection in concentric relation thereto, said electromagnetic clutch comprising:

a rotatable body made of magnetizable material and disposed around said hollow cylindrical projection of said driven device in concentric relation thereto, said rotatable body being drivingly connectable to said drive source for rotation around an axis of said shaft and having an inner peripheral surface faced to said cylindrical projection and opposite axial end faces;

a bearing disposed between an outer peripheral surface of said cylindrical projection and the inner peripheral surface of said rotatable body for rotatably supporting said rotatable body on said cylindrical projection;

an annular armature made of magnetizable material and connectable to said shaft of said driven device for rotation therewith, said armature being faced to one of the opposite axial end faces of said rotatable body, but normally spaced therefrom by a suitable gap, said armature being movable between an engaging position where said armature is attracted and abuts against said one axial end face of said rotatable body to allow the rotation of said rotatable body by said drive source to be transmitted to said shaft and a disengaging position where said armature is spaced from said one axial end face of said rotatable body by said suitable gap to prevent the rotation of said rotatable body from being transmitted to said shaft;

an exciting solenoid associated with said armature for moving the same between said engaging and disengaging position in response to energization and deenergization of said solenoid; and a cylindrical cover member made of thermoplastic material and fixedly mounted, independently of said bearing, on a portion of the inner peripheral surface of said rotatable body between said one axial end face thereof and said bearing, said cover member having a cylindrical peripheral wall having an axial length thereof extending so as to cover said gap between said one axial end face of said rotatable body and said annular armature and also cover an inner peripheral surface of said annular armature, said cylindrical cover further having an annular end wall radially inwardly extending from one axial end of said peripheral wall of said cylindrical cover member remote from said bearing, to a location where an opening defined by an inner peripheral edge of said annular end wall is located adjacent to a free end of said hollow cylindrical projection of said driven device, said peripheral wall and said annular end wall of said cover member cooperating with each other to define a reservoir space having a relatively large volume for oil leaking out of said driven device and grease flowing from said bearing.

2. An electromagnetic clutch defined in claim 1, further comprising connecting means for connecting said armature and said shaft of said driven device to each other so as to allow said armature to be rotated with said shaft and also allow said armature to move toward and away from said one axial end face of said rotatable body relative to said shaft.

3. An electromagnetic clutch defined in claim 2, wherein said one axial end face of said rotatable body is located adjacent to a free end of said shaft of said drive device, said connecting means including a hub fixedly connected to said free end of said shaft and a resilient member disposed between and secured to said hub and said armature.

4. An electromagnetic clutch defined in claim 3, wherein said hub has a cup-shaped body portion and a hollow projecting portion axially extending from a bottom of said cup-shaped body portion, said free end of said shaft extending into said hollow projecting portion, said annular end wall of said cylindrical cover member extending to a location closely adjacent to the outer peripheral surface of said hollow projecting portion.

5. An electromagnetic clutch defined in claim 4, wherein said resilient member is a rubber ring secured to peripheral surface of said cup-shaped body portion.

6. An electromagnetic clutch defined in any one of claims 1-5, wherein said rotatable body has an annular groove formed in a portion of the inner peripheral surface thereof between said bearing and said one axial end face, said cylindrical cover member having at least one projection extending radially outwardly from the opposite axial end of said peripheral wall of said cylindrical cover member, said at least one projection being frictionally fitted into said annular groove.

7. An electromagnetic clutch defined in claim 6, wherein said at least one projection on the opposite axial end of said peripheral wall of said cylindrical cover member extends circumferentially continuously.

8. An electromagnetic clutch defined in claim 7, wherein said cylindrical cover member is made of material having resiliency.

9. An electromagnetic clutch defined in claim 8, wherein said cylindrical cover member is made of 66-nylon.

10. An electromagnetic clutch defined in any one of claims 1-5, wherein said rotatable body has therein a concentric recess, said solenoid being annular and disposed in said concentric recess in concentric relation thereto.

11. An electromagnetic clutch for respectively connecting and disconnecting a drive source to and from a driven device having a fixed hollow cylindrical projection and a rotatable shaft extending within said hollow projection in concentric relation thereto, said electromagnetic clutch comprising:

a rotatable body made of magnetizable material and disposed around said hollow cylindrical projection of said driven device in concentric relation thereto, said rotatable body being drivingly connectable to said drive source for rotation around an axis of said shaft and having an inner peripheral surface facing said cylindrical projection and opposite axial end faces;

a bearing disposed between an outer peripheral surface of said cylindrical projection and the inner peripheral surface of said rotatable body for rotatably supporting said rotatable body on said cylindrical projection;

an annular armature made of magnetizable material and connectable to said shaft of said driven device for rotation therewith, said armature being faced to one of the opposite axial end faces of said rotatable body, but normally spaced therefrom by a suitable gap, said armature being movable between an engaging position where said armature is attracted and abuts against said one axial end face of said rotatable body to allow the rotation of said rotatable body by said drive source to be transmitted to said shaft and a disengaging position where said armature is spaced from said one axial end face of said rotatable body by said suitable gap to prevent the rotation of said rotatable body from being transmitted to said shaft;

an exciting solenoid associated with said armature for moving the same between said engaging and disengaging position in response to energization and deenergization of said solenoid; and a cylindrical cover member made of thermoplastic material and disposed in concentric relation to said hollow cylindrical projection of said driven device, said cover member having a cylindrical peripheral wall having one axial end thereof adjacent to said bearing and the other axial end remote therefrom, said one axial end of said peripheral wall being fixedly mounted, independently of said bearing, on a portion of the inner peripheral surface of said rotatable body between said one axial end face thereof and said bearing, said peripheral wall having an axial length thereof extending so as to cover said gap between said one axial end face of said rotatable body and said annular armature and also cover an inner peripheral surface of said annular armature, said cover member further having an annular end wall extending radially inwardly from said other axial end of said peripheral wall to a location where an opening defined by an inner peripheral edge of said annular end wall is located adjacent to a free end of said hollow cylindrical projection of said driven device, said peripheral wall and said annular end wall of said cover member cooperating with each other to define a reservoir space having a relatively large volume for oil leaking out of said driven device and grease flowing from said bearing.

* * * * *